United States Patent [19]

Rousseau et al.

[11] 3,715,523

[45] Feb. 6, 1973

[54] POSITIONING MECHANISM FOR MAGNETIC HEAD

[75] Inventors: Hubert Cecyl Albert Rousseau; Lucien Robert Prieur, Paris, France

[73] Assignee: Societe Industrielle Honeywell Bull (Societe Anonyme), Paris, France

[22] Filed: June 25, 1971

[21] Appl. No.: 156,633

[30] Foreign Application Priority Data

July 2, 1970 France....7024574

[52] U.S. Cl. ....179/100.2 CA, 340/174.1 F

[51] Int. Cl. ....G11b 5/54

[58] Field of Search.......179/100.2 CA, 100.2 C, 100.2 MD; 340/174 C, 174 F; 274/4 A, 11 A

[56] References Cited

UNITED STATES PATENTS

| | | | |
|---|---|---|---|
| 3,429,578 | 2/1969 | Furuichi | 179/100.2 CA |
| 3,190,970 | 6/1965 | Atsumi | 179/100.2 CA |
| 3,584,878 | 6/1971 | Seregni | 274/4 A |
| 3,445,116 | 5/1969 | Knox | 179/100.2 CA |
| 3,556,534 | 1/1971 | Barz | 274/4 A |

*Primary Examiner*—Vincent P. Canney
*Attorney*—Ronald T. Reiling et al.

[57] ABSTRACT

A device for controlling the positioning of heads for magnetic discs between non-operative retracted positions and operating positions proximate a surface of the disc wherein a simple compact mechanism selectively moves and locks the heads in their operating position when they reach a reference position opposite the disc or continues the heads in their retracted position for maintenance purposes.

8 Claims, 2 Drawing Figures

PATENTED FEB 6 1973

3,715,523

INVENTORS
Hubert Cecyl Albert Rousseau
Lucien Robert Prieur
BY Ronald T Reiling
ATTORNEY INVENTORS
Hubert Cecyl Albert Rousseau
Lucien Robert Prieur
BY Ronald T Reiling
ATTORNEY

POSITIONING MECHANISM FOR MAGNETIC HEAD

BACKGROUND OF THE INVENTION

This invention relates to a control device for magnetic heads and, more particularly, to a device for moving magnetic heads substantially perpendicularly to the surface of an information bearing medium, such as a disc, between a retracted position, relatively distant from such surface, and an operating position, proximate to such surface.

Magnetic heads which are supported by a carriage are known particularly in disc memories of data processing systems. The carriage is translated, parallel to the plane of a magnetic disc, in order to bring the heads from a position remote from the disc to a position above a reference track of the disc. The carriage is provided with a control device for also moving the heads transversely to the surface of the disc. When these heads are positioned close to the disc surface (operating position), the carriage, pursuant to commands which it receives, translates the heads parallel to the surface of the disc to perform the commanded operation on the designated track. When the reading or writing of information is terminated, the heads are withdrawn from the disc (retracted position) by the control device and the carriage returns to its position remote from the disc.

Control devices of this type are known in the art. One such device has a torsion bar carrying at least one magnetic head and is controlled from external to the carriage by a linkage mechanism or gears which enables the displacement of the head in two directions, perpendicularly to the surface of the disc. Such mechanism is complicated, difficult to adjust and, in addition, relatively bulky, which increases the inertia of the carriage.

In a second prior art device the heads are mounted on the end of a leaf spring, which urges the heads in the direction of the magnetic disc and cooperates with an inclined plane, whereby the heads are moved away from the disc only when the position of the carriage places the heads outside the periphery of the disc.

However, during maintenance operations in which there is no reading or writing, when the carriage is translated, for example manually, there is a danger of rubbing the heads on the disc, thereby damaging them. This danger is particularly great when the computer has a plurality of parallel discs, of which some are fixed and others are removable, and wherein all of the heads are controlled in synchronism and supported from the same carriage.

Accordingly it is the object of the present invention to remedy the above-mentioned disadvantages of the prior art magnetic head control devices.

SUMMARY OF THE INVENTION

In accordance with the instant invention, a control device for at least one magnetic head provides for moving such head in a direction substantially perpendicular to the surface of an information bearing medium, between a retracted position, relatively distant from said surface, and an operating position, proximate to such surface. The control device is borne, at least in part, by a carriage which also supports the magnetic head, and which is controlled by fixed elements external to the carriage. The carriage is translatable, parallel to the plane of the information bearing medium, in two directions. Such control device is characterized in that it comprises a shaft rotatably mounted on the carriage and having attached thereto at least one cam which corporates with one end of a rocking arm. The other end of the rocking arm supports the magnetic head. The external elements control the rotation of the shaft. Accordingly, the inertia of the carriage may be very small.

In the preferred embodiment, the rotating shaft is substantially perpendicular to the direction of translation of the carriage and the cam is a disc, substantially perpendicular to the shaft. One end of the rocking arm is urged against one face of the cam, for example by means of an adjustable stop. The rocking arm pivots on an axle which is orthogonal to the shaft and the longitudinal axis of this arm is substantially parallel to the translational direction of the carriage.

The elements external to the carriage and controlling the rotation of the shaft may comprise a retractable stop, which cooperates with a lever affixed to the shaft in order to rotate the shaft to a position at which a mechanism is latched that is intended to maintain the magnetic head in its operating position.

The instant invention remedies the disadvantages of the above-described second prior art device because, when the stop is retracted, the carriage can be displaced without controlling the magnetic heads.

In the preferred embodiment, the control device of the invention comprises external elements for controlling the rotation of the shaft which are disposed at a fixed station that corresponds to a position of the magnetic head above a predetermined track of the information bearing medium. In this manner the external elements, by means of a movable engaging device, can engage the shaft in order to latch the mechanism intended for maintaining the magnetic head in its operating position.

Thus, in such embodiment the approach of the head toward the disc does not occur gradually during the translation of the carriage but, instead, occurs at a fixed station when the carriage is halted. After the aforementioned mechanism is latched and the movable engaging device is deactivated, reading or writing can then be performed on the other tracks of the information bearing medium.

BRIEF DESCRIPTION OF THE DRAWING

The invention will be described with reference to the accompanying drawing, wherein.

DESCRIPTION OF THE PREFERRED EMBODIMENT

Figure 1:
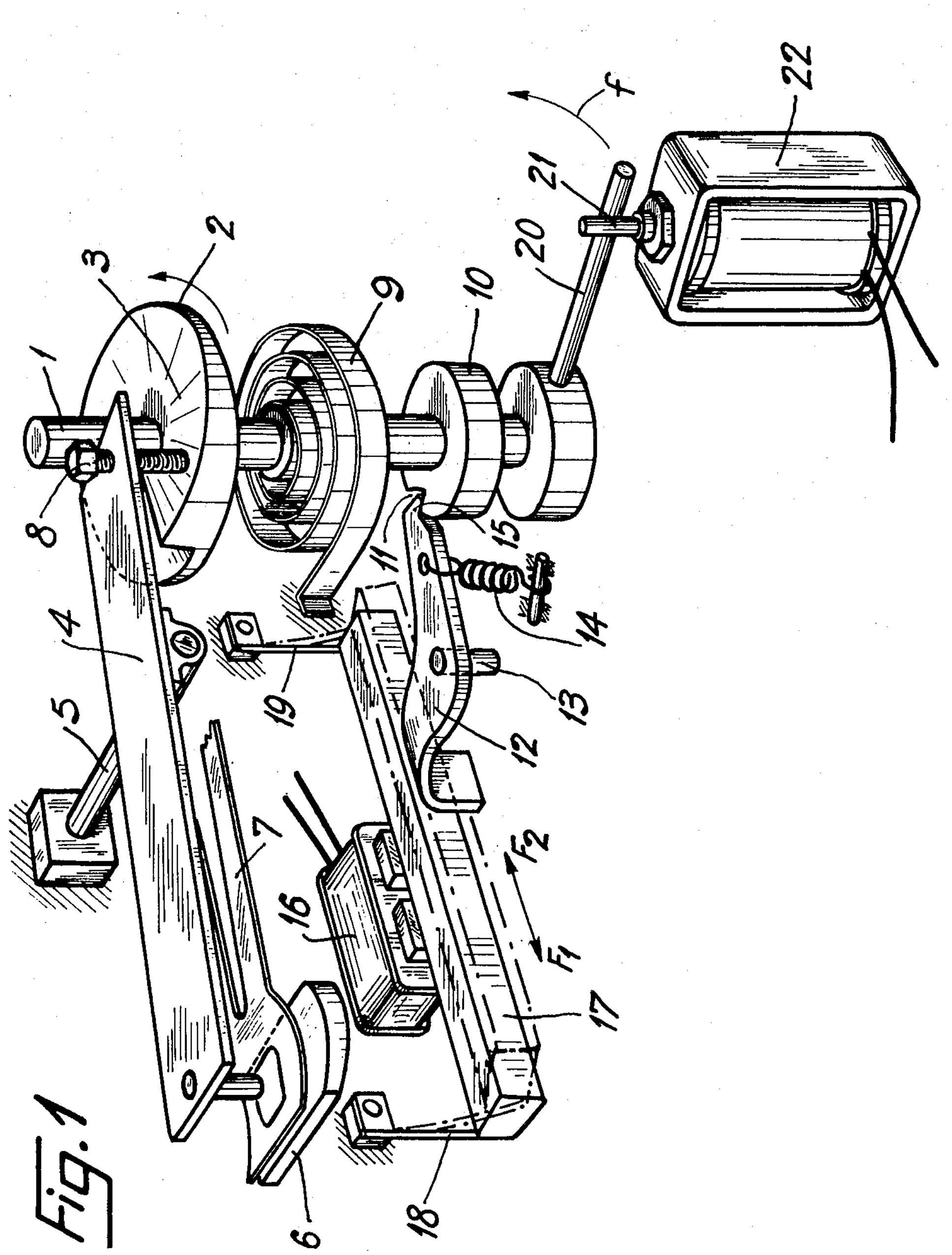
FIG. 1 is a perspective view of a first embodiment of the control device of the invention.
Figure 2:
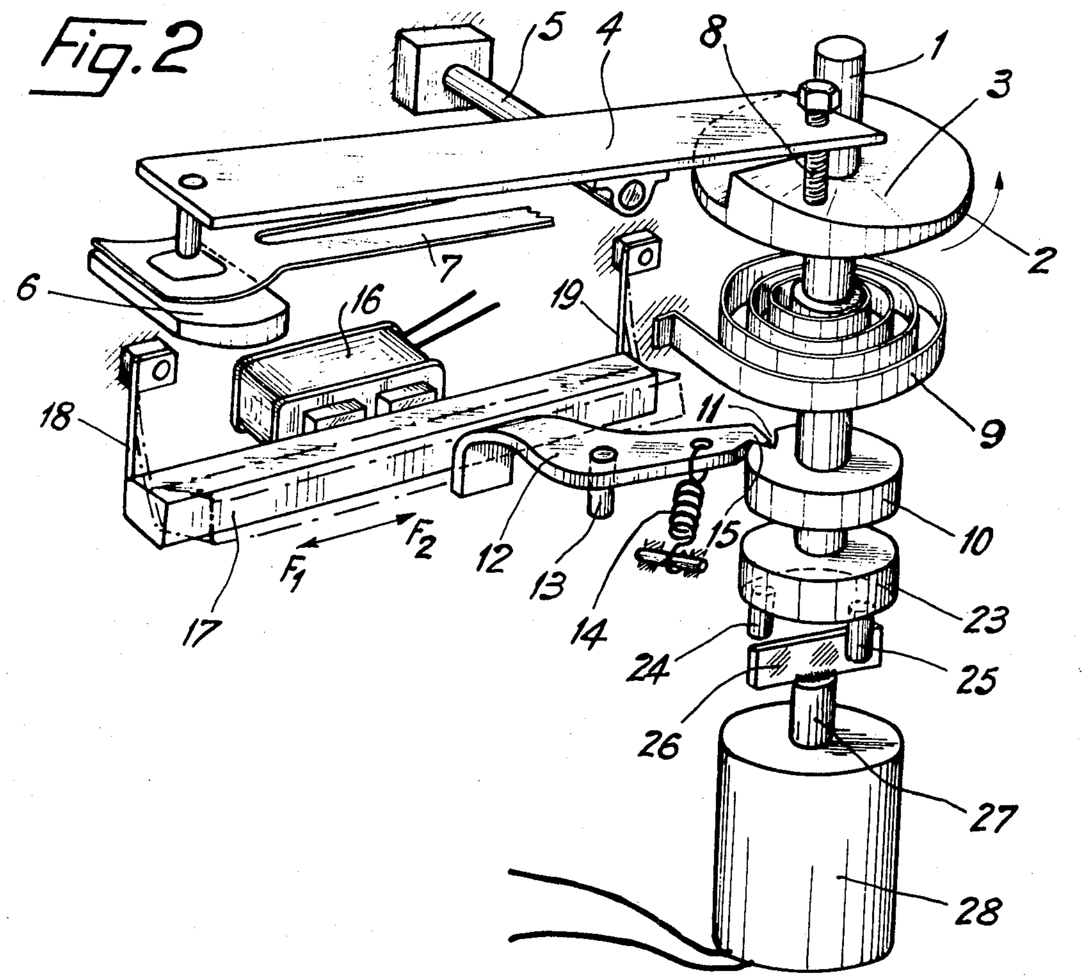
FIG. 2 is a perspective view of a second embodiment of the invention of FIG. 1.

The devices of FIGS. 1 and 2 comprise a carriage (not shown) adapted to be translated horizontally in two directions, represented by arrows $F_1$ and $F_2$. A vertical shaft 1 turns on the carriage. A horizontal disc cam 2 is affixed to shaft 1, the upper face 3 of cam 2 having the cam contour. An arm 4 is mounted for rocking on an axle 5, which is attached to the carriage.

Arm 4 bears a magnetic head 6 at one end thereof by means of a flexible tongue 7, and the other end thereof rests on face 3 by means of an adjustable stop screw 8, which is threaded through arm 4.

In addition, the devices of FIGS. 1 and 2 comprise a spiral spring 9, concentric with shaft 1, one end of spring 9 being attached to shaft 1 and the other end thereof being attached to the carriage. A disc 10 is affixed to shaft 1 and is provided with a notch 11. A catch 12, pivoting on an axle 13 and urged in the direction disc 10 by a spring 14, bears a tip 15 for engaging in notch 11.

A control member for catch 12 comprises an electromagnetic 16 which normally attracts an armature 17 supported on the carriage by spring blades 18 and 19, which are stressed under the attraction of electromagnetic 16.

The device of FIG. 1 also comprises a lever 20 affixed to shaft 1 and transverse thereto. Lever 20 is adapted for engaging with a retractable stop 21 which is disposed in the path of lever 20 when the carriage is tranlated. Stop 21 may be the end of a movable armature of an electromagnetic 22.

Thus, when stop 21 is in its released position and as the carriage is driven toward the magnetic disc (not shown) in the direction of arrow $F_1$, lever 20 meets stop 21. From this moment, as the carriage continues to advance, lever 20 pivots in the direction of arrow *f*, forcing, in turn, shaft 1, cam 2, and disc 10 to rotate against the resistance of spring 9. As a consequence of the cooperation of rocking arm 4 and cam 2, head 6 is lowered toward the magnetic disc. These movements continue until tip 15 engages in notch 11, at which time head 6 has reached its operating position above the magnetic disc. If now, stop 21 is retracted, head 6 is enabled to sense all desired tracks of the magnetic disc. When it is required to move the carriage back (in the direction of arrow $F_2$) electromagnet 16 is deenergized, whereby armature 17 strikes against catch 12 under the urging of blades 18 and 19. Tip 15 thereupon emerges from notch 11 and shaft 1 is restored to its initial position by the release of spring 9. In this initial position, if stop 21 is held retracted, the carriage can be moved by hand without transferring head 6 to its operating position.

The device of FIG. 2 comprises an additional disc 23, which is concentric with and attached to shaft 1. Disc 23 bears two diametrically opposed pins 24 and 25 which are adapted to cooperate with a vane 26 that is attached to the end of a rotatable armature 27 of an electromagnet 28. When the carriage is driven toward the magnetic disc in the direction of arrow $F_1$, pins 24 and 25 become positioned on opposite sides of vane 26 and the carriage is halted in this position, which corresponds to a reference position for head 6. If, now, electromagnet 28 is energized, vane 26 makes a fraction of a revolution causing, in turn, the rotation of pins 24 and 25. Shaft 1, thereby rotates similarly to the embodiments of FIG. 1. Head 6 is thereby lowered and catch 12 is locked. Vane 26 is then returned to its initial position (shown in FIG. 2) by deenergization of electromagnet 28. Head 6 can then assume all operating positions on the magnetic disc. The deenergization of electromagnet 16 again provides for raising head 6. Thus, with the device of FIG. 2 it is also possible to manually slide the carriage without lowering head 6, provided that electromagnet 28 is not energized so that vane 26 thereupon passes between pins 24 and 25.

The embodiments illustrated in FIGS. 1 and 2 have been intentionally simplified by illustrating only a single rocking arm 4 and a single head 6. It is evident that cam faces 3 can be provided on both sides of disc cam 2 and, consequently, a head 6 can be associated in the manner described above with each face of cam 2. Thus, reading or writing can be performed on both faces of a magnetic disc. Likewise, several disc cams 2 can be affixed on a single shaft 1.

That which has been described in the foregoing and is represented in the drawing is characteristic of the invention. It is evident that one skilled in the art is able to adduce all modifications of form and of detail using his judgement, without departing from the scope of the invention.

What is claimed is:

1. A control device for at least one magnetic head providing for moving such head in a direction substantially perpendicular to the surface of an information bearing medium having a plurality of tracks, between a retracted position relatively distant from said surface, and an operating position proximate to said surface, said device being at least in part mounted on a carriage supporting said head, and said carriage being translatable toward and away from said medium along a position parallel to the plane of said medium surface, said control device comprising; a rocking arm pivotably mounted on said carriage and having said magnetic head disposed on one end thereof, a shaft rotatably mounted on said carriage and having at least one cam, attached thereto, said cam being located for engagement with the opposite end of said arm, to pivot said arm and move said head in said perpendicular direction on rotation thereof means affixed to said shaft and extending therefrom for turning said shaft when moved about said shaft axis, and stationary means mounted on means other than said carriage and aligned with said shaft turning means for engaging and controlling said shaft turning means, to thereby cause rotation of said shaft and rotation of said cam to move said arm and magnetic head toward said medium, from said retracted position to said operating position.

2. The control device of claim 1, wherein said shaft is substantially perpendicular to the direction of translation of said carriage, wherein said cam is disc-shaped and is substantially perpendicular to said shaft, wherein said one end of said rocking arm is urged against one face of said cam, wherein said rocking arm pivots on an axle orthogonal to said shaft, and wherein the longitudinal axis of said arm is substantially parallel to the translational direction of said carriage.

3. The control device of claim 2, wherein said rocking arm is urged against said one cam face by an adjustable stop.

4. The control device of claim 1, wherein said shaft turning means is a lever and further comprising a latching mechanism, and wherein said stationary engaging means comprise a retractable stop for cooperating with said lever affixed to said shaft during translation of said carriage toward said medium for turning said shaft to a position at which said latching mechanism latches said shaft to maintain said magnetic head in its operating position;

5. The control device of claim 4 wherein said latching mechanism comprises a disc mounted on said shaft and having a notch therein, said disc being concentric with said shaft, and a catch for engaging in said notch and resiliently urged against said disc, and wherein a spring is connected to said shaft, said spring biasing said shaft in a rotational direction to resist said shaft rotating in the direction corresponding to the movement of said head from its retracted position to its operating position.

6. The control device of claim 5, further comprising an actuating means for said catch formed of an armature attracted by an electromagnet against the action of said spring means.

7. The control device of claim 1 further comprising a latching mechanism, and wherein said stationary engaging means controlling the rotation of said shaft are disposed at a fixed station corresponding to a position of said carriage at which said head is above a predetermined track of said information bearing medium said engaging means comprising a movable element for contacting said means for turning said shaft when said carriage is halted in said position for turning said shaft to a position at which said latching mechanism maintains said head in its operating position.

8. The control device of claim 7, wherein said stationary engaging means comprise an electromagnet having a rotatable armature bearing said element adapted for contacting engaging element borne by one end of said shaft and passing between said engaging means.

* * * * *